United States Patent
Liu et al.

(10) Patent No.: US 7,012,817 B2
(45) Date of Patent: Mar. 14, 2006

(54) CONVERTER WITH INTEGRATED ACTIVE CLAMP CIRCUIT AND BIAS CIRCUIT

(75) Inventors: Ya Liu, Hangzhou (CN); Daifu Xiong, Hangzhou (CN); Yi Jiang, Hangzhou (CN); Guichao Hua, Edison, NJ (US)

(73) Assignee: Bel-Fuse, Inc., Jersey City, NJ (US)

(*) Notice: Subject to any disclaimer, the term of this patent is extended or adjusted under 35 U.S.C. 154(b) by 66 days.

(21) Appl. No.: 10/776,967

(22) Filed: Feb. 10, 2004

(65) Prior Publication Data

US 2005/0174811 A1   Aug. 11, 2005

(51) Int. Cl.
*H02M 3/335* (2006.01)

(52) U.S. Cl. .............................. 363/20; 363/49; 363/70

(58) Field of Classification Search ............... 363/21.4, 363/21.12, 21.7, 20, 95, 56.1, 16, 49, 70; 323/222, 282; 307/39, 31, 74
See application file for complete search history.

(56) References Cited

U.S. PATENT DOCUMENTS 6,130,826 A * 10/2000 Matsumoto .............. 363/21.15
6,441,590 B1 * 8/2002 Amantea et al. ............ 323/266
6,822,427 B1 * 11/2004 Wittenbreder ............... 323/282

* cited by examiner

*Primary Examiner*—Rajnikant B. Patel
(74) *Attorney, Agent, or Firm*—Ostrolenk, Faber, Gerb & Soffen, LLP

(57) ABSTRACT

A converter includes a transformer having a primary winding, a secondary winding and an auxiliary winding, a first switching device for connecting an input voltage to the primary winding of the transformer, an output circuit connected to the secondary winding, a controller, and an integrated active clamp and primary bias circuit. The integrated active clamp and primary bias circuit includes the auxiliary winding and a second switch providing a bias voltage to the controller to alternately operate the first and second switches between conductive and non-conductive states. When the first switch is conductive the second switch is nonconducting and power is transferred from the primary winding to the output circuit via the secondary winding and from the auxiliary winding to the controller. When the first switch is nonconducting, the second switch is conducting and the voltage across the primary winding is clamped.

6 Claims, 4 Drawing Sheets

CONVERTER WITH INTEGRATED ACTIVE CLAMP CIRCUIT AND BIAS CIRCUIT

BACKGROUND OF THE INVENTION

1. Field of Invention

The present invention relates generally to converters and, more particularly, to converters having integrated active clamp and primary bias circuits.

2. Description of the Prior Art

A DC-DC converter, such as an SMPS (Switch Mode Power Supply) converter, is a device that converts a DC input voltage to a different DC output voltage.

SMPS converters are very versatile. They can be used, for example, to:
1. step down an unregulated dc input voltage to produce a regulated dc output voltage using a circuit known as Buck Converter or Step-Down SMPS,
2. step up an unregulated dc input voltage to produce a regulated dc output voltage using a circuit known as Boost converter or Step-Up SMPS,
3. step up or step down an unregulated dc input voltage to produce a regulated dc output voltage using a Buck-Boost Converter.

Converters are also characterized as either flyback converters, forward converters or combinations thereof.

A flyback converter generally has a Buck-Boost SMPS topology in which, during the first half of the switching period, energy is stored in the transformer and during the second half of the period this energy is transferred to the transformer secondary and into the load.

A forward converter generally has a Buck-derived SMPS topology in which energy is transferred to the transformer secondary winding and the load when the switching transistor is on.

Whether a converter is a flyback converter, a forward converter or a combined forward-flyback converter, it is necessary to provide a primary bias circuit for the controller which controls the switching cycle and also to provide a primary clamp circuit.

In the case of forward converters, the purpose of the clamp circuit is to reset the core flux of the transformer. More specifically, in a forward converter only positive voltage is supplied across the transformer core during the conduction of the primary switch. As a result, the flux continues to increase with the application of the input voltage. The flux increases until the core saturates and circuit failure occurs. Accordingly, it is necessary to supply negative voltage to reset the core flux. This is generally effected with a clamp circuit.

In the case of flyback transformers used in flyback converters, although they do not require flux reset circuitry, they do require clamp circuitry to clamp any voltage spike on the primary power switch.

There are several types of clamp circuits employed which generally fall into two categories: active and passive. Active clamp circuits are generally preferred. This is particularly so in the case of flyback converters when a high voltage is used. This is because in this case there is considerable insulation material between the primary and the secondary of the transformer which leads to large leakage inductance. This, in turn, results in large voltage spikes on the primary which require an active clamp circuit for effective clamping.

SUMMARY OF THE INVENTION

The present invention is directed to a converter having an integrated active clamp circuit and primary bias circuit.

According to the invention, the converter may include a transformer having a primary winding, a secondary winding and an auxiliary winding, a first switching device for connecting an input voltage to the primary winding of the transformer, an output circuit connected to the secondary winding, a controller, and an integrated active clamp and primary bias. The integrated active clamp and primary bias circuit includes the auxiliary winding and a second switch for providing a bias voltage to the controller to alternately operate the first and second switches between conductive and non-conductive states such that when the first switch is conductive the second switch is nonconducting and power is transferred from the primary winding to the output circuit via the secondary winding and from the auxiliary winding to the controller and, when the first switch is nonconducting, the switch is conducting to provide voltage clamping of the primary winding via the second switch and the auxiliary winding.

Other features and advantages of the present invention will become apparent from the following description of the invention which refers to the accompanying drawings.

BRIEF DESCRIPTION OF THE DRAWING(S)

DETAILED DESCRIPTION OF THE PREFERRED EMBODIMENT(S)

By way of example and not of limitation, the present invention will be described in connection with its applicability to a forward converter, a flyback converter and a forward-flyback converter. Components of the various embodiments having the same or similar functions have the same reference designations.

Forward Converter

Figure 1:
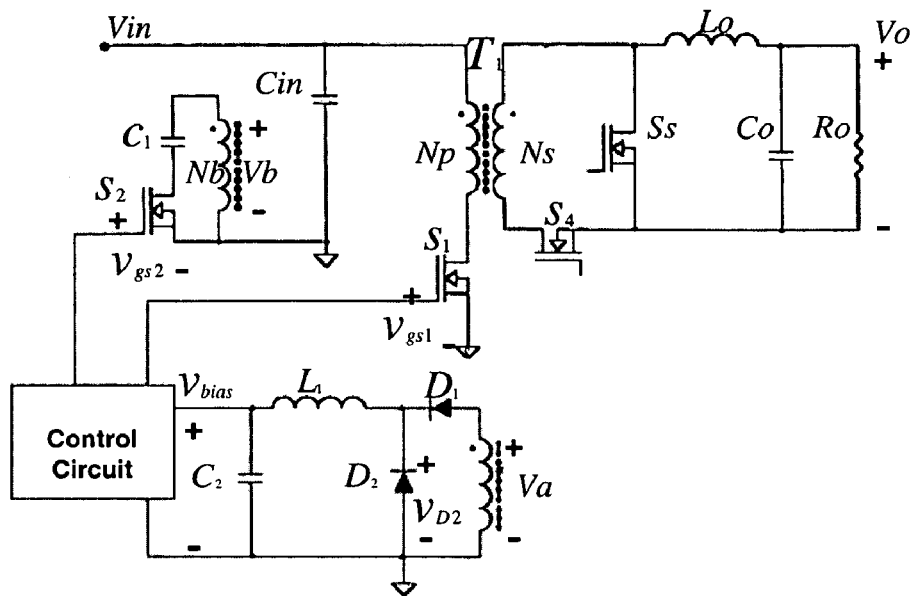
FIG. 1 illustrates a circuit diagram of an embodiment of a conventional forward converter with a separate active clamp circuit and a separate primary bias circuit.

FIG. 1 shows the circuit diagram of a conventional forward converter with an active clamp circuit. As shown, a DC voltage at the input is connected to the primary winding Np of a transformer T1 via a main power switch S1. The conventional active clamp circuit is formed by an auxiliary switch S2 and a capacitor C1 in parallel with an auxiliary winding Nb of the transformer T1. The conventional forward converter also includes a separate primary bias circuit comprising an auxiliary winding Na of the transformer T1 connected to a rectifier diode D1, a freewheeling diode D2, and an LC filter comprising an inductor L1 and a capacitor C2. The secondary winding Ns of the transformer T1 is connected to an output load through an output filter comprising inductor Lo, capacitor Co and a synchronous rectifier including switches S3 and S4.

Figure 2:
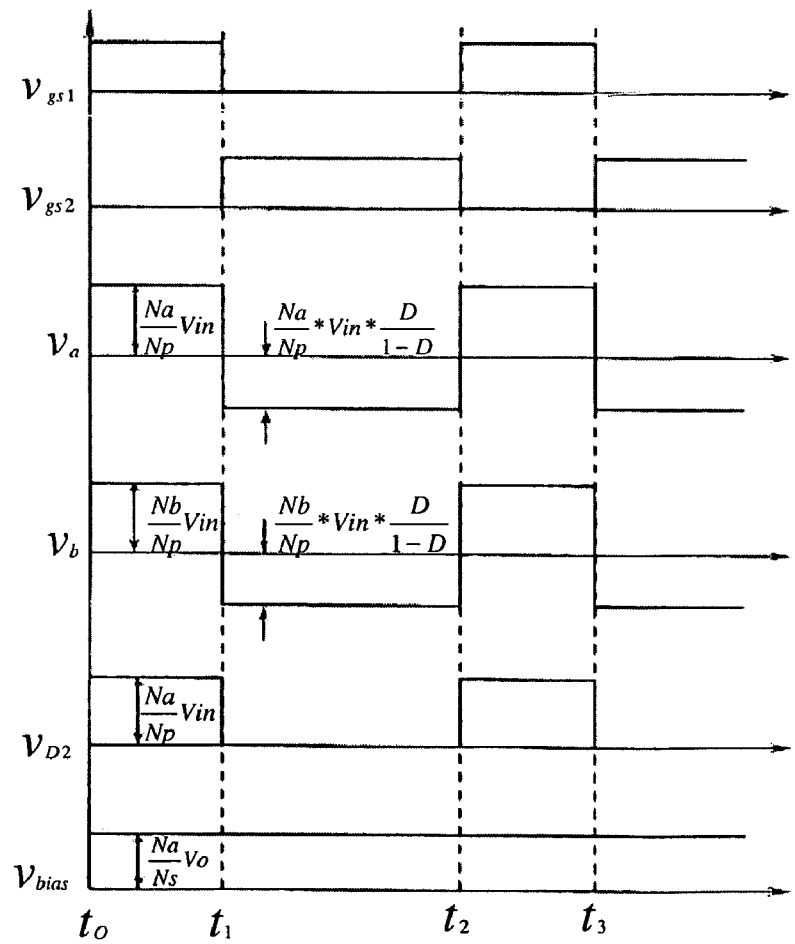
FIG. 2 illustrates the switching waveforms occurring in the converter illustrated in FIG. 1.

In a forward converter as shown in FIG. 1, the switching waveforms of which are shown in FIG. 2, when power switch S1 is conducting, auxiliary switch S2 is off and energy is transferred via the secondary winding Ns of the transformer T1 to the output load and is transferred via the auxiliary winding Na to the primary bias circuit. During this period, diode D1 conducts to transfer energy to the control circuit 10 and store energy in filter inductor L1. During the off period of S1, auxiliary switch S2 is turned on to reset transformer T1, while the control circuit 10 is biased with the energy stored in inductor L1 through D2. Accordingly, reset of transformer T1 is effected by the separate active clamp circuit comprising auxiliary switch S2, capacitor C1 and auxiliary winding Nb. As a result, an average bias voltage for the control circuit 10 is formed separately in the conventional forward converter of FIG. 1.

Figure 3:
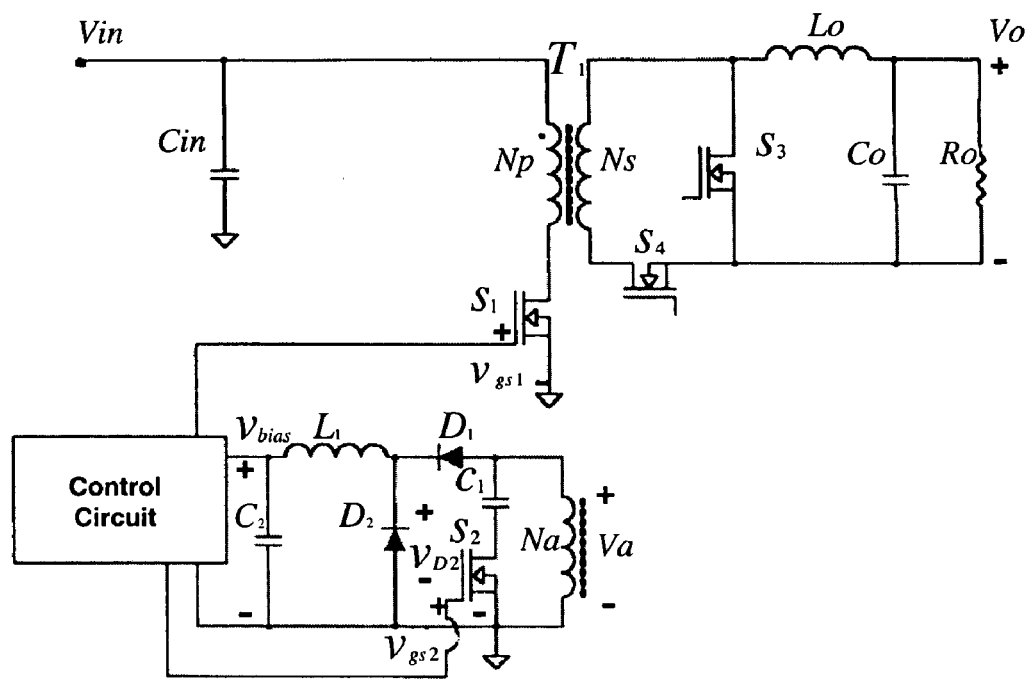
FIG. 3 illustrates a circuit diagram of an embodiment according to the present invention showing a forward converter having an integrated active clamp circuit and a primary bias circuit.

FIG. 3 is a circuit diagram of a forward converter according to the invention incorporating an integrated active clamp circuit and primary bias circuit. In this converter, the active clamp circuit comprising switch S2 and capacitor C1 is now connected in parallel with auxiliary winding Na that also transfers energy for the primary bias circuit.

Figure 4:
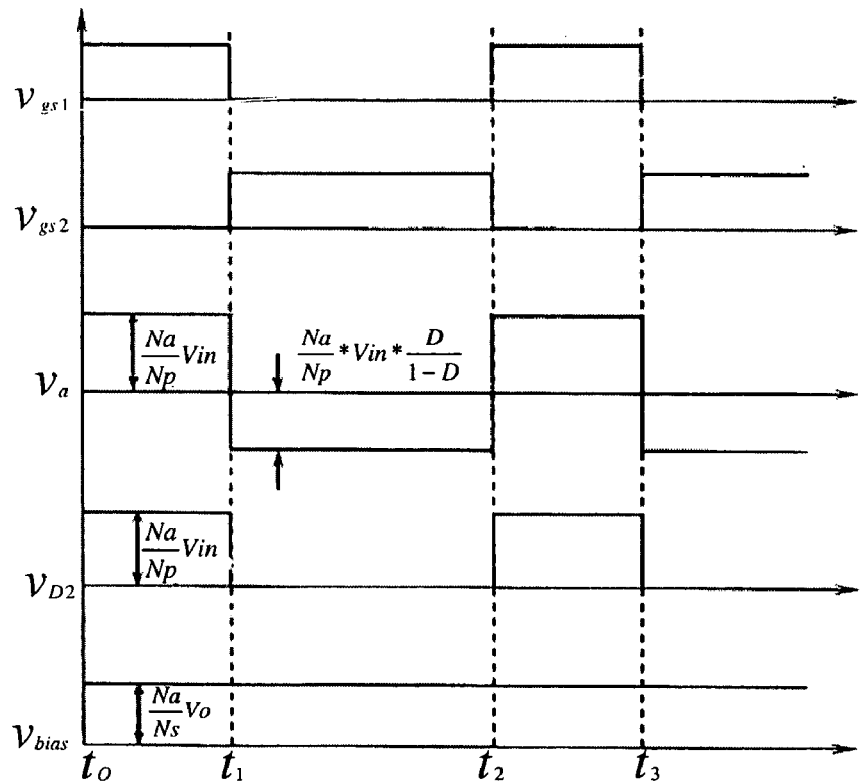
FIG. 4 illustrates the switching waveforms occurring in the converter illustrated in FIG. 3.

In operation, the main switch S1 and the active clamp switch S2 are turned on and off alternately by the control circuit. During [t0, t1] (FIG. 4), main power switch S1 is turned on and winding Na is positively biased, so diode D1 conducts to allow energy to be transferred to the control circuit and stored in filter inductor L1 at the same time. The active clamp switch S2 is off during this period with a voltage as show in FIG. 4. At time t1, S1 is turned off. The voltage on the primary winding Np of transformer T1 reverses as do the voltages on the secondary winding Ns and the auxiliary winding Na. Then diode D1 is reverse biased and freewheeling diode D2 conducts to bias the control circuit with the energy stored in inductor L1 during the conduction of switch S1. The auxiliary switch S2 is also turned on by the control circuit during this nonconduction period of S1 to reset the transformer actively via winding Na. As seen, the auxiliary winding Na is a common part of both the active clamp circuit and the primary bias circuit. The selection of the number of auxiliary winding turns is determined by the bias voltage the control circuit requires.

Flyback Converter

Figure 5:
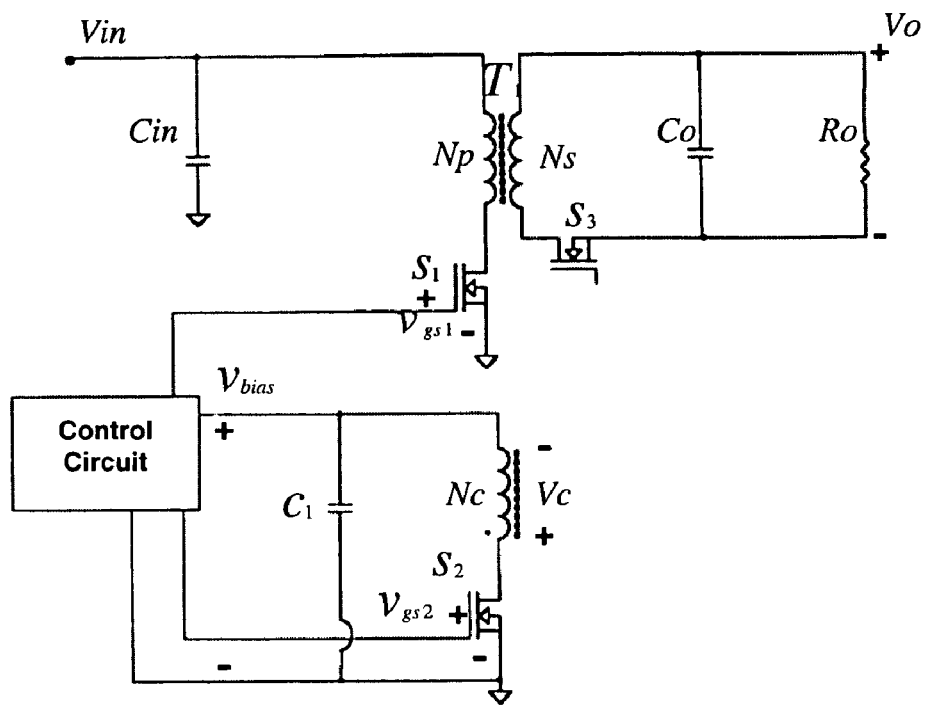
FIG. 5 illustrates an application o the novel combination of an active clamp circuit with a primary bias circuit of the present invention applied to flyback converter.
Figure 6:
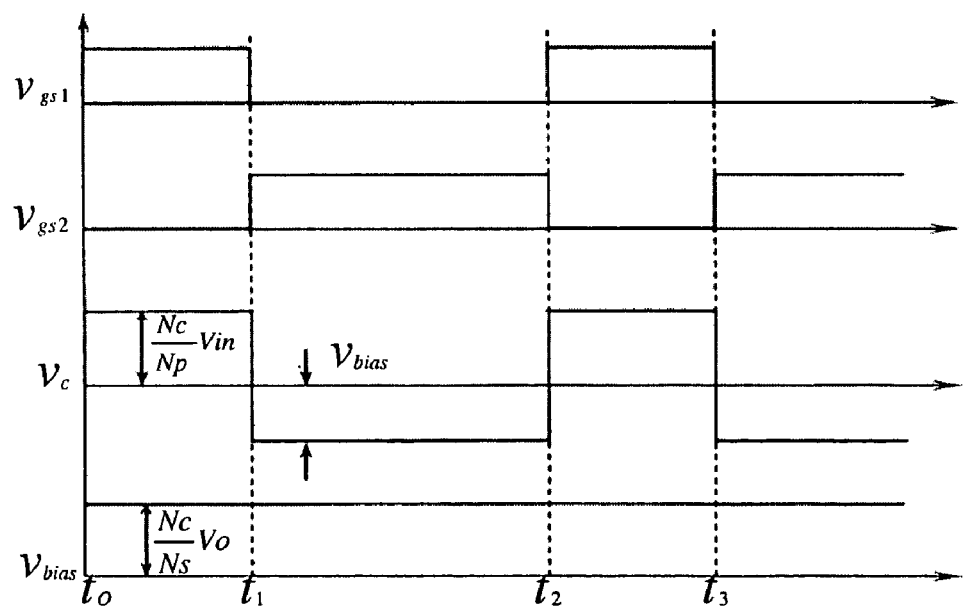
FIG. 6 illustrates the switching waveforms occurring in the converter illustrated in FIG. 5.

FIG. 5 illustrates an application of the novel combination of an integrated clamp circuit with a primary bias circuit of the present invention applied to a flyback converter having a flyback transformer T1, and FIG. 6 illustrates the switching waveforms occurring in the converter illustrated in FIG. 5.

In operation, the power switch S1 and the active clamp switch S2 are turned on and off alternately by the control circuit 10. During [t0, t1](FIG. 6), power switch S1 is on and winding Nc is positively biased, i.e., the dot end of winding Nc is positive compared to the non-dot end. The active clamp switch S2 is off during this period with a voltage as shown in FIG. 6. At time t1, S1 is turned off. The energy stored in transformer T1 during the conduction of S1 is transferred to the control circuit 10 and the voltage spike (not shown) on S1 due to the leakage inductance between primary and secondary windings is clamped via the capacitor C1, auxiliary winding Nc and the switch S2. S2 is still turned on during the turn-off of S1 as a part of the bias circuit. As seen, the auxiliary winding Nc is a common part of both the active clamp circuit and the primary bias circuit. The selection of the number of winding turns of the auxiliary winding Nc is determined by the bias voltage the control circuit requires.

Forward-Flyback Converter

Figure 7:
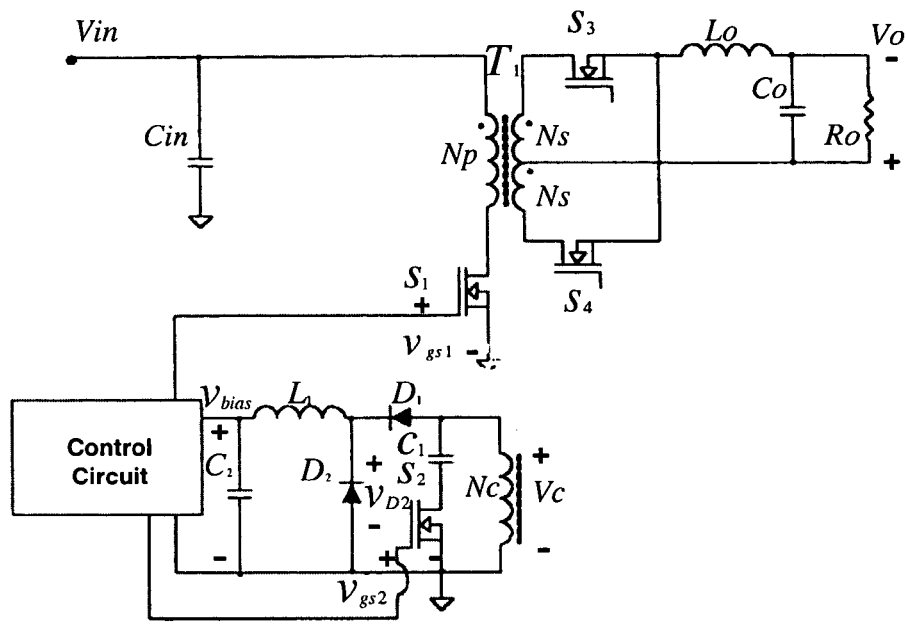
FIG. 7 illustrates an application of the novel combination of an active clamp circuit with a primary bias circuit of the present invention applied to forward-flyback converter.
Figure 8:
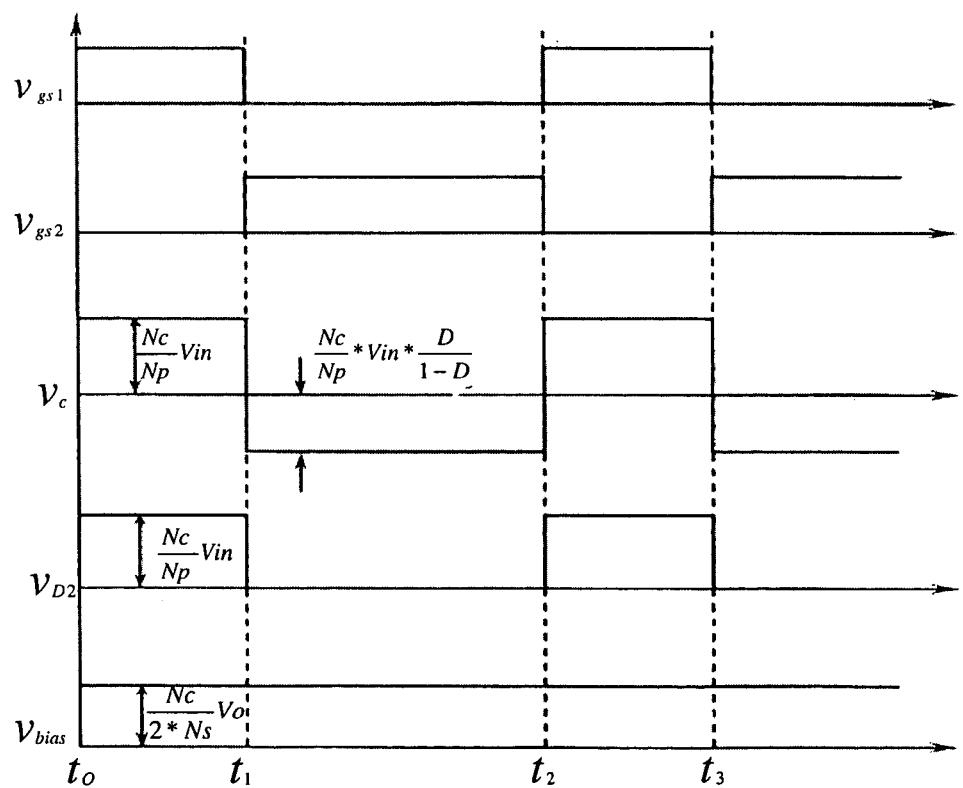
FIG. 8 illustrates the switching waveforms occurring in the converter illustrated in FIG. 7.

FIG. 7 illustrates an application of the novel combination of an active clamp circuit with a primary bias circuit of the present invention applied to forward-flyback converter having a flyback transformer T1, and FIG. 8 illustrates the switching waveforms occurring in the converter illustrated in FIG. 7.

In operation, the main switch S1 and the active clamp switch S2 are turned on and off alternately by the control circuit. During [t0, t1] (FIG. 8), power switch S1 is turned on and winding Nc is positively biased, i.e., the dot end of winding Nc is positive compared to the non-dot end. As a result diode D1 conducts to allow energy to be transferred to the control circuit 10 and stored in filter inductor L1 at the same time. The active clamp switch S2 is off during this period with a voltage stress as shown in FIG. 8. At time t1, S1 is turned off. The voltage on the primary winding Np of transformer T1 reverses, as do the voltages on the secondary winding Ns and the auxiliary winding Nc. Then diode D1 is reverse biased and freewheeling diode D2 is conducting to bias the control circuit 10 with the energy stored in inductor L1 during the conduction of switch S1. The auxiliary switch S2 is also turned on by the control circuit 10 during this turn-off period of S1 to reset the transformer actively via winding Nc. As seen, the auxiliary winding Nc is a common part of both the active clamp circuit and the primary bias circuit. The selection of the number of winding turns of the auxiliary winding Nc is determined by the bias voltage the control circuit requires.

As described above, in converters incorporating an integrated active clamp circuit with a primary bias circuit, an auxiliary winding (e.g., the winding Nb) is omitted. This enables an increase in the power density of DC-DC converters. This is because the ever-increasing demand in power density requirements for isolated DC-DC converters, has made it common for a PCB (Printed Circuit Board) transformer to be used instead of using a traditional transformer with several windings mounted on a bobbin. However, if a PCB transformer contains too many windings, it will require an expensive multi-layer PCB and a considerable number of terminal connections. This makes it difficult to achieve a high power density. By saving an auxiliary winding, as in the present invention, it is much easier to design a PCB transformer with fewer windings to satisfy the desire for high power density.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A converter which comprises:
    a transformer having a primary winding, a secondary winding and an auxiliary winding;
    a first switching device for connecting an input voltage to the primary winding of the transformer;
    an output circuit connected to the secondary winding;
    a controller; and
    an integrated active clamp and primary bias circuit including the auxiliary winding and a second switch for providing a bias voltage to the controller to alternately operate the first and second switches between conductive and non-conductive states such that when the first switch is conductive the second switch is nonconducting and power is transferred from the primary winding to the output circuit via the secondary winding and from the auxiliary winding to the controller and, when the first switch is nonconducting, the second switch is conducting to provide voltage clamping of the primary winding of the transformer via the auxiliary winding and the second switch.

2. A forward converter which comprises:
a transformer having a primary winding, a secondary winding and an auxiliary winding;
a first switching device for connecting an input voltage to the primary winding of the transformer;
an output circuit connected to the secondary winding;
a controller; and
an integrated active clamp and primary bias circuit including the auxiliary winding, a second switch, an inductor and a capacitor connected in series with the second switch, the capacitor and the second switch being connected in parallel with the auxiliary winding, the integrated active clamp and primary bias circuit providing a bias voltage to the controller, the controller alternately operating the first and second switches between conductive and non-conductive states during first and second parts of a switching cycle such that in the first part of the cycle the first switch is conductive, the second switch is nonconducting and power is transferred from the primary winding to the output circuit via the secondary winding and from the auxiliary winding to the controller and to the inductor, and in the second part of the cycle, the first switch is nonconducting, the second switch is conducting and the voltage across the primary switch is clamped via the second switch, the auxiliary winding and the capacitor and power is supplied to the controller via the inductor.

3. A flyback converter which comprises:
a flyback transformer having a primary winding, a secondary winding and an auxiliary winding;
a first switching device for connecting an input voltage to the primary winding of the transformer;
an output circuit connected to the secondary winding; a controller; and
an integrated active clamp and primary bias circuit including the auxiliary winding, a second switch in series with the auxiliary winding, and a capacitor connected in parallel with the auxiliary winding and the second switch, the integrated active clamp and primary bias circuit providing a bias voltage to the controller, the controller alternately operating the first and second switches between conductive and non-conductive states during first and second parts of a switching cycle such that in the first part of the cycle the first switch is conductive, the second switch is nonconducting and energy is stored in the transformer and in the second part of the cycle the first switch is nonconducting, the second switch is conducting and power is transferred to the output circuit and the controller, and the voltage across the first switch is clamped via the auxiliary windings, the second switch and the capacitor.

4. A forward-flyback converter which comprises:
a flyback transformer having a primary winding, a secondary winding and an auxiliary winding;
a first switching device for connecting an input voltage to the primary winding of the transformer;
an output circuit connected to the secondary winding;
a controller; and
an integrated active clamp and primary bias circuit including the auxiliary winding, a second switch, an inductor and a capacitor connected in series with the second switch, the capacitor and the second switch being connected in parallel with the auxiliary windings the integrated active clamp and primary bias circuit providing a bias voltage to the controller, the controller alternately operating the first and second switches between conductive and non-conductive conductive states during first and second parts of a switching cycle such that in the first part of the cycle the first switch is conductive, the second switch is nonconducting and power is transferred from the primary winding to the output circuit via the secondary winding and from the auxiliary winding to the controller and to the inductor, and in the second part of the cycle the first switch is nonconducting, the second switch is conducting and the voltage across the primary winding is clamped via the second switch, the auxiliary winding and the capacitor and power is supplied to the controller via the inductor.

5. A converter according to claim 2, wherein the integrated active clamp and primary bias circuit includes a first diode arranged to be forward biased during the first part of the switching cycle and reverse biased during the second part of the cycle to enable power to flow from the auxiliary winding to the inductor and the controller only during the first part of the cycle and a second diode arranged to be reversed biased during the first part of the cycle and forward biased during the second part of the cycle to allow power to be transferred from the inductor to the controller during the second part of the cycle.

6. A converter according to claim 4, wherein the integrated active clamp and primary bias circuit includes a first diode arranged to be forward biased during the first part of the switching cycle and reverse biased during the second part of the cycle to enable power to flow from the auxiliary winding to the inductor and the controller only during the first part of the cycle and a second diode arranged to be reversed biased during the first part of the cycle and forward biased during the second part of the cycle to allow power to be transferred from the inductor to the controller during the second part of the cycle.

* * * * *